United States Patent [19]

Gates et al.

[11] Patent Number: 4,568,801
[45] Date of Patent: Feb. 4, 1986

[54] TELEPHONE DESK STAND/WALL MOUNTING APPARATUS

[75] Inventors: Frank V. Gates, Succasunna; William P. McGreevy, West Orange, both of N.J.

[73] Assignee: AT&T Information Systems Inc., Holmdel, N.J.

[21] Appl. No.: 519,252

[22] Filed: Aug. 1, 1983

[51] Int. Cl.⁴ .............................................. H04M 1/11
[52] U.S. Cl. ............................ 179/100 C; 179/146 R; 179/178; 179/100 R; 248/126
[58] Field of Search .................... 179/100 C, 146, 147, 179/178, 179; 312/245, 10; 248/126, 558, 458; 425/572, 588; 249/105, 110; 339/125 R

[56] References Cited

U.S. PATENT DOCUMENTS

| | | | |
|---|---|---|---|
| 2,733,479 | 2/1956 | English | 249/110 |
| 2,979,300 | 4/1961 | Howell et al. | 248/126 |
| 3,430,906 | 3/1969 | Danz et al. | 248/126 |
| 3,480,741 | 11/1969 | Wiggins | 179/146 R |
| 3,715,519 | 2/1973 | O'Heary | 179/100 C |
| 3,799,488 | 3/1974 | Sena | 248/452 |
| 3,837,614 | 9/1974 | Palovits et al. | 249/108 |
| 3,859,476 | 1/1975 | Morrell et al. | 179/100 C |
| 3,941,951 | 3/1976 | Engstrom et al. | 179/179 |
| 4,349,706 | 9/1982 | Thompson | 179/100 C |
| 4,395,591 | 7/1983 | Kaczkos | 179/100 R |
| 4,406,928 | 9/1983 | MacKenzie | 179/146 R |
| 4,411,485 | 10/1983 | Wisehart et al. | 339/125 R |

FOREIGN PATENT DOCUMENTS 2326283 12/1974 Fed. Rep. of Germany ... 179/100 C

*Primary Examiner*—Gene Z. Rubinson
*Assistant Examiner*—R. Vaas
*Attorney, Agent, or Firm*—John A. Caccuro

[57] ABSTRACT

The telephone mounting apparatus comprises a rectangular frame base unit having a protrusion at one end and two slots at a second end for accepting either of two brackets. A telephone desk stand is constructed by inserting a first bracket into the slots in the base unit. The desk stand utilizes a first load bearing surface of the protrusion. A telephone wall mounting is constructed by inserting a second bracket into the slots in the base unit. The wall mounting utilizes a second load bearing surface of the protrusion.

9 Claims, 9 Drawing Figures

TELEPHONE DESK STAND/WALL MOUNTING APPARATUS

FIELD OF THE INVENTION

This invention relates to a telephone set mounting apparatus and, in particular, to apparatus for mounting a telephone set on a horizontal (desk) surface or a vertical (wall) surface.

BACKGROUND OF THE INVENTION

Some modern telephone station sets are designed either to be wall mounted or placed on a desk stand. This requires that both a wall mounting and a desk stand mounting be provided for these alternate telephone mounting positions. It is an object of the present invention to provide apparatus for use as a wall mounting or as a desk stand for a telephone station set.

SUMMARY OF THE INVENTION

The present invention accomplishes this object using apparatus including a base unit, which when connected to a wall bracket, forms a telephone station set wall mounting and which, when connected to a desk bracket, forms a station set desk stand. These apparatus piece parts are molded together in a break-apart configuration to facilitate manufacturing, shipping, and user assembly.

The base unit includes a connecting means at one end and a protrusion including two load bearing surfaces at a second end. A station set wall mounting is formed when the wall bracket is connected to the base unit. The wall mounting supports the station set using the wall bracket and a first load bearing surface of the protrusion on the base unit. A desk mounting is formed when the desk bracket is connected to the base unit. The desk mounting supports the station set using the desk bracket and a second load bearing surface of the protrusion on the base unit.

BRIEF DESCRIPTION OF THE DRAWING

A better understanding of the invention may be had from the following detailed description taken in conjunction with the accompanying drawing in which.

DETAILED DESCRIPTION

Figure 1:
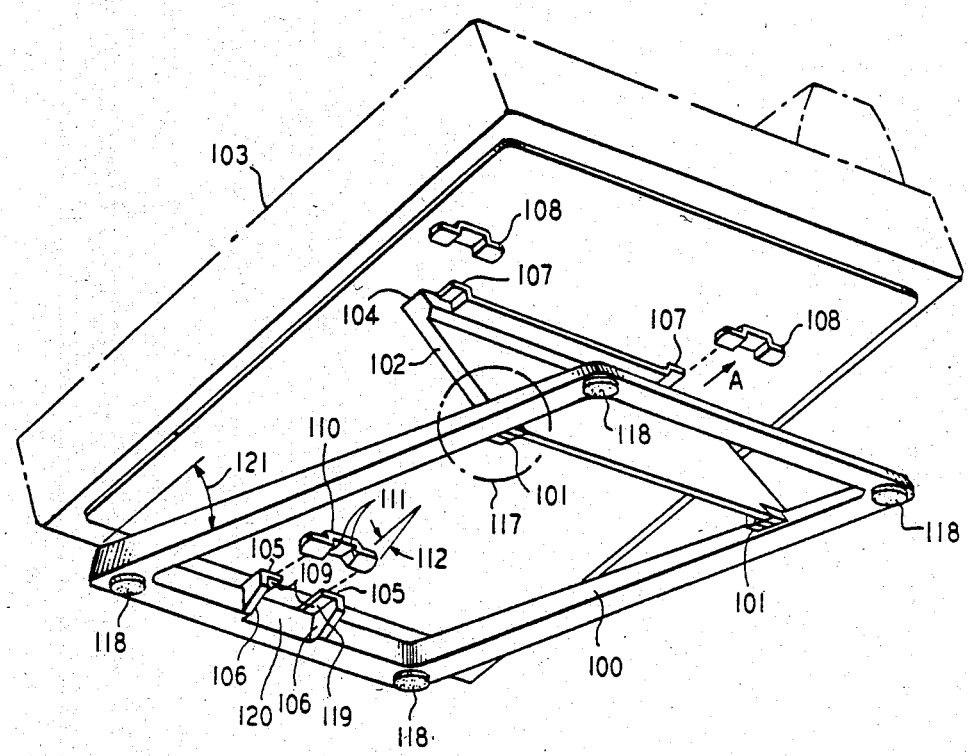
FIG. 1 is a perspective view illustrating the connection of a station set to the desk mounting.

Referring to FIG. 1 of the drawing, a desk mounting in accordance with the present invention is shown. The desk mounting comprises a substantially rectangular ring frame shaped base unit 100 including a protrusion 106 on the top of one end extending at an acute angle to the base and slotted connecting means 101 on the inner edges of the other end for receiving desk bracket 102. The station set 103 is supported at an acute angle 121, which may be about 20 degrees from a desk surface, by surface 104 of desk bracket 102 and surface 105 of U-shaped protrusion 106 of base unit 100. Lips 107 on either end of surface 104 slip into and engage with brackets 108 on the bottom of station set 103 when the desk stand is moved in direction A, preventing lateral movement between station 103 and the desk mounting (100, 102). The particular apparatus used for engaging telephone set 103 with the desk bracket 102 obviously could be implemented using other well known arrangements.

The lips 109 on the inner sides of U-shaped protrusion 106 slide into and engage with bracket 110 on the bottom of station set 103. This engagement likewise prevents lateral movement between station set 103 and desk mounting (100, 102). As will be described in a later paragraph, the ears 111 of bracket 110 form an acute angle 112 with the bottom surface of station set 103. Again, this engaging apparatus can be implemented using other well known apparatus.

Figure 2:
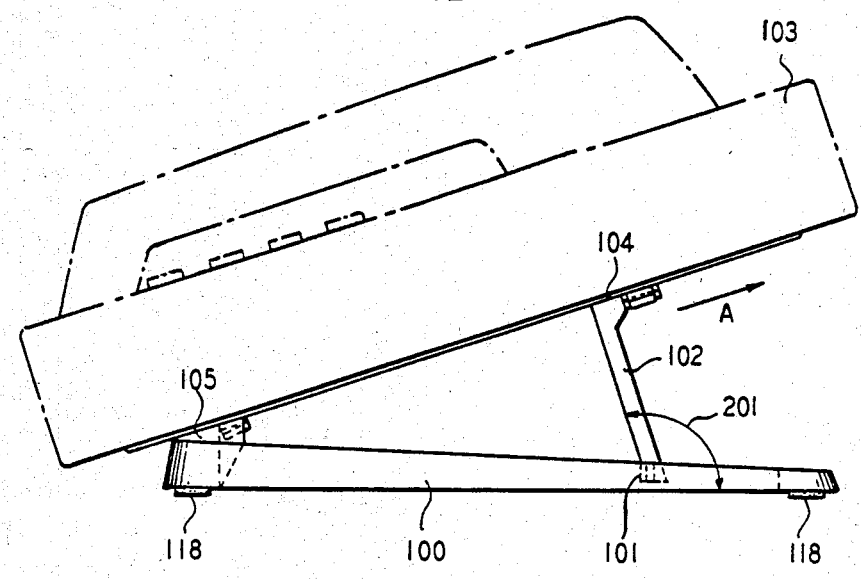
FIG. 2 is a side view illustrating a station set connected to the desk mounting.

As shown, FIG. 2 illustrates a side view of station set 103 fully engaged with desk stand (100, 102) and resting substantially on surface 104 of desk bracket 102 and surface 105 of base unit 100. In this position, the forces exerted by station set 103 on the desk stand (100, 102) keep the desk bracket from disconnecting from base unit 100. It should be noted that desk bracket 102 mounts at an angle 201 equal to ninety degrees plus angle 121.

It should be clear that the previously described station set bracket and lip engagement apparatus permits station set 103 only to be moved in the direction A relative to desk stand 100, 102. Movement of station set 103 in direction A results in removing the station set from the stand. The base unit 100 of the desk stand includes self-sticking feet on pads 118, which are attached at each corner of the base unit. In one embodiment, molded-in depressions in the corners of the base unit are used to hold rubber or urethane feet to prevent slippage of the base unit on the desk.

Figure 3:
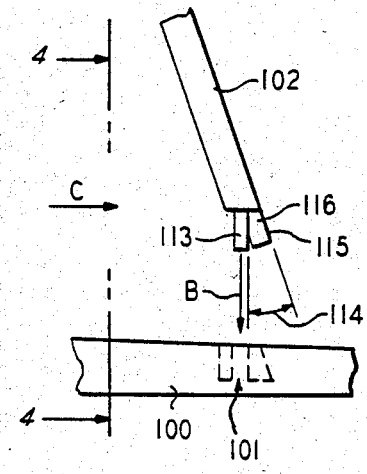
FIG. 3 shows a cutaway illustration of the connection apparatus of the desk bracket and the base unit.
Figure 4:
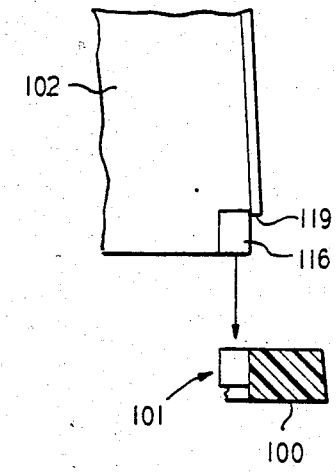
FIG. 4 shows a cutaway back view of FIG. 3.

Turning now to FIGS. 3 and 4, the connection of desk bracket 102 to base unit 100 will be described. Shown in FIG. 3 is a cutaway side view of section 117 of FIG. 1. Shown in FIG. 4 is a view of section 4.4 looking from direction C of FIG. 3. Obviously, connection at the other end of desk bracket 102 occurs in a mirror opposite manner. With joint reference to FIGS. 3 and 4, base unit 100 includes a slotted connecting means 101 for receiving a tab 113 formed at an acute angle 114 with respect to edge 115 of desk bracket 102.

As shown in FIG. 3, desk bracket 102 is inserted into base unit 100 by moving the desk bracket in the direction B toward the top of base unit 100. When the desk stand is assembled, the surface 119 of desk bracket 102 rests on the top surface of base unit 100 to transfer loads to the base unit (100) proper, rather than to tabs (101).

Figure 5:
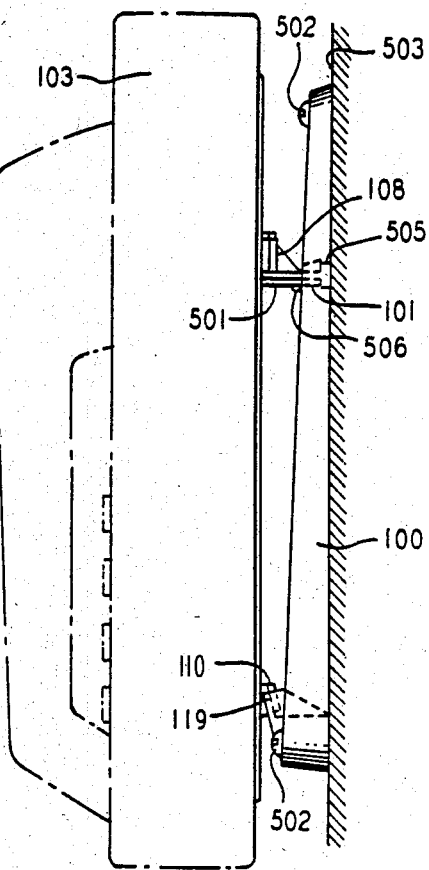
FIG. 5 is a side view illustrating a station set connected to the wall mounting.

Referring to FIG. 5, a side view of a station set wall mounting is shown comprising base unit 100 including slotted connecting means 101 for receiving wall bracket 501. No screws or other hardware are required to attach or connect wall bracket 501 to base unit 100. In this arrangement, station set 103 is supported by wall bracket 501 and by under surface 119 of lips 109 of protrusion 106. Self-tapping screws 502 are mounted through thin membranes which cover holes at each corner of base unit 100 to affix wall mounting 100/501 to wall 503 or other vertical surface. The thin membranes which cover mounting holes are illustrated by dotted lines 903 in FIG. 9. The thin membranes cover the mounting holes thus preserving the pleasant smooth appearance when base unit 100 is used as part of the desk stand.

Figure 6:
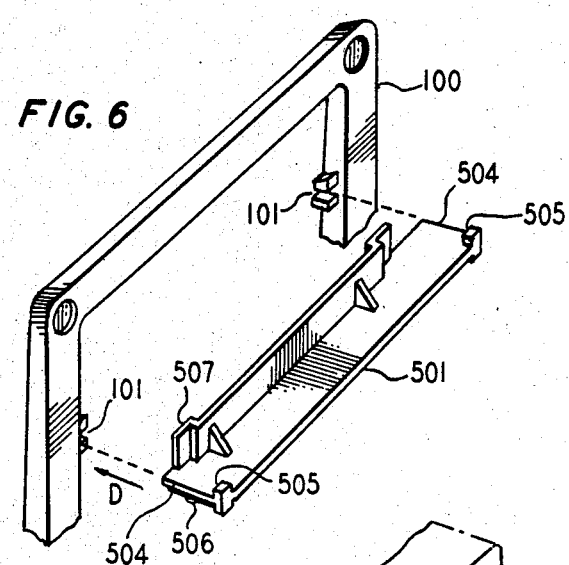
FIG. 6 shows an illustration of the connection apparatus of the wall bracket and the base unit.

With reference to FIG. 6, wall bracket 501 is shown being received into the slotted connecting means 101 through the bottom of base unit 100. The assembly requires moving wall bracket 501 in the direction D through the bottom opening of connecting means 101 of base unit 100. Edges 504 of wall bracket 501 slide in direction D through slotted connecting means 101 until posts 505 and protuberance 506 lock around slotted connecting means 101. This fully assembled locked position is shown in FIG. 7.

Figure 7:
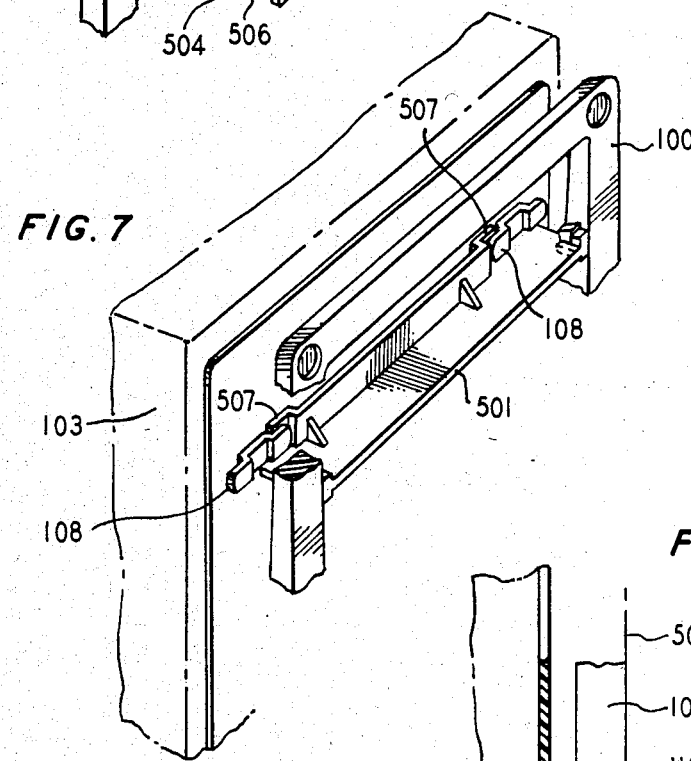
FIG. 7 shows the completed connection of the wall bracket to the base unit.

FIG. 7 also illustrates the alignment of lips 507 of wall bracket 501 with the ears of brackets 108 of station set 103. The engagement of lips 507 and brackets 108 occurring in the same manner as the previously-described connection of lips 107 of desk bracket 102 with brackets 108 of station set 103. It should be noted that the insertion of wall bracket 501 from the bottom side of base unit 100, as described in FIG. 6, prevents movement of wall bracket 501 once wall mounting (501, 100) is attached to a wall. That is, with reference to FIG. 5, wall 503 prevents posts 505 (i.e., wall bracket 501) from moving towards the wall, and slotted connecting means 101 prevent wall bracket 501 from being pulled away from base unit 100 and wall 503. Thus, wall mounting (501, 100) acts as a one piece unit under the normal forces encountered when a station set is mounted thereon.

Figure 8:
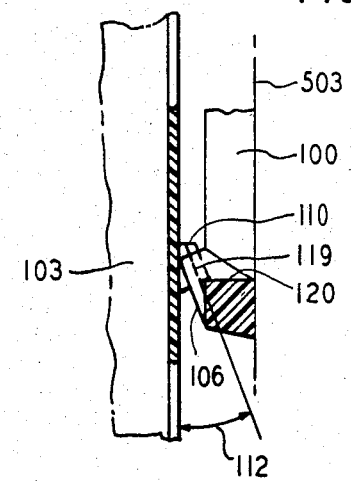
FIG. 8 shows the details of the connection of the station set to the protrusion on the base unit when the station set is wall mounted.

FIG. 8 illustrates a detailed cutaway view of the wall mounting connection between protrusion 106 of base unit 100 and bracket 110 of station set 103. As shown, the ears of bracket 110 engages load bearing edge surface 119 and bottom surface 120 of protrusion 106. The acute angle 112 of the ears of bracket 110 permit station set 103 to be mounted parallel to wall 503.

In a manner similar to that described previously for the desk mounting of FIG. 1, brackets 108 and 110 prevent lateral and downward movement by station 103 relative to wall mounting 100, 501. Moreover, movement of station set 103 towards and away from the wall is also prevented by the connection of wall mounting 100, 501 to brackets 108 and 110 of the station set.

Figure 9:
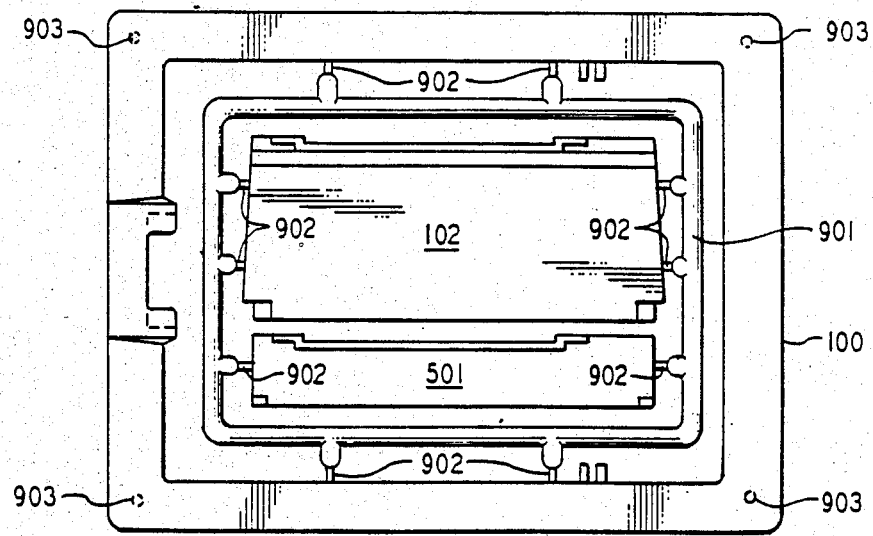
FIG. 9 shows how the piece parts of the desk stand/wall mounting are molded together in a break-apart configuration.

FIG. 9 illustrates how the apparatus piece parts (wall bracket 501, desk bracket 102, and base unit 100) are connected together with runner 901 during the injection-molding process. The apparatus piece parts are designed so that brackets 501 and 102 can be molded within base unit 100. These desk stand/wall apparatus piece parts are injection molded from plastic or other well known molding compounds. The relative simplicity of the piece part design enables a low cost construction using a simple two part mold. The color and finishing texture of the piece parts are also incorporated into the parts during the molding process. Appropriate markings (not shown) are also molded into the respective pieces to identify them to the user/assembler.

Runner 901 includes narrowed posts 902 which connect to the piece parts and which are easily broken off by the user/assembler. Once broken apart, the piece parts are relatively clean and may need only slight deburring or sanding prior to assembling either the desk stand or wall mounting. As noted previously, a thin plastic membrane 903 covers the holes in the corners of base unit 100 so as not to detract from the asthetic appearance when base unit 100 is used as part of a desk stand. The one piece assembly results in the manufacturer, supplier, and installer having only to stock one assembly which can be broken apart and connected to form a wall mounting or a desk stand for a station set.

What has been described is merely illustrative of our invention. Other embodiments known to those skilled in the art could be utilized without departing from the spirit and scope of the present invention. Thus, connection arrangements, other than the slotted connecting means 101, between base unit 100 and both wall bracket 501 and desk bracket 102 are contemplated. For example, base unit 100 can include holes into which posts on wall bracket 501 or desk bracket 502 connect. Similarly, connections of the desk mount and wall mount to station sets which do not utilize bracket 108 and 110 (for example, using slots in the station set and hooks on the and other shapes of base unit 100, wall bracket 501 and desk bracket 102 are contemplated as within the scope of the present invention. Additionally, application of our invention to other telephone or communication equipment which require both a desk and wall mounting configuration is also contemplated as within the knowledge of those skilled in the art.

What is claimed is:

1. Apparatus for providing a desk stand mounting and a wall mounting for a station set comprising:
   a base including a pair of connecting means at a first end and a protrusion at a second end, said protrusion extending at an acute angle to a top surface of the base and including a first and a second load bearing surfaces;
   a desk bracket adapted for inserting into said pair of connecting means of said base;
   a wall bracket adapted for inserting into said pair of connecting means of said base;
   said desk stand mounting being assembled by inserting said desk bracket in said connecting means of said base, said desk stand mounting supporting said station set using both said desk bracket and said first load bearing surface of said protrusion; and
   said wall mounting being assembled by inserting said wall bracket in said connecting means of said base, said wall mounting supporting said station set using both said wall bracket and said second load bearing surface of said protrusion.

2. The station set mounting apparatus of claim 1 wherein said base, said desk bracket, and said wall bracket are piece parts which are molded together during manufacture in a one piece assembly having break-apart connections therebetween for separating the piece parts.

3. The station set mounting apparatus of claim 2 wherein said base is frame shaped and said desk and wall brackets are molded within the frame shaped base during manufacture.

4. The station set mounting apparatus of claim 1 wherein said base is frame shaped and wherein said connecting means includes a pair of slots each formed on an inside edge of said frame shaped base for receiving said desk and wall brackets.

5. The station set mounting apparatus of claim 4 wherein said wall bracket is received by said pair of slots through a bottom surface of said base.

6. The station set mounting apparatus of claim 1 wherein said wall bracket includes means for engaging a station set bracket located on a bottom surface of said station set, thereby preventing relative motion between said station set mounting apparatus and said station set in any direction other than a direction for dismounting said station set bracket from said engaging means when said station set is mounted on said wall bracket.

7. The station set mounting apparatus of claim 1 wherein said desk bracket includes means for engaging a station set bracket located on a bottom surface of said station set, thereby preventing relative motion between said station set mounting apparatus and said station set in any direction other than a direction for dismounting said station set bracket from said engaging means when said station set is mounted on said desk bracket.

8. The station set mounting apparatus of claim 1 wherein said protrusion includes means for engaging a bracket on a bottom surface of said station set and for preventing lateral movement between said mounting apparatus and said station set.

9. The station set mounting apparatus of claim 1 wherein said desk bracket, when inserted in said connecting means of said base, forms an angle of ninety degrees plus said acute angle between said connected desk bracket and a top surface of said first end of said base.

* * * * *